(12) United States Patent
Gulati et al.

(10) Patent No.: US 11,146,359 B2
(45) Date of Patent: Oct. 12, 2021

(54) METHODS FOR RETRANSMISSION FOR IMPROVED HANDLING OF VULNERABLE SYMBOLS

(71) Applicant: QUALCOMM Incorporated, San Diego, CA (US)

(72) Inventors: Kapil Gulati, Hillsborough, NJ (US); Shuanshuan Wu, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/802,940

(22) Filed: Feb. 27, 2020

(65) Prior Publication Data

US 2020/0304236 A1    Sep. 24, 2020

Related U.S. Application Data

(60) Provisional application No. 62/822,665, filed on Mar. 22, 2019.

(51) Int. Cl.
*H04L 1/00* (2006.01)
*H04W 76/27* (2018.01)
*H04L 1/18* (2006.01)
*H04L 5/00* (2006.01)

(52) U.S. Cl.
CPC .......... *H04L 1/0068* (2013.01); *H04L 1/1819* (2013.01); *H04L 1/1845* (2013.01); *H04L 5/0082* (2013.01); *H04W 76/27* (2018.02)

(58) Field of Classification Search
CPC ... H04L 1/0068; H04L 1/1819; H04L 1/1845; H04L 5/0082; H04W 76/27
See application file for complete search history.

(56) References Cited

U.S. PATENT DOCUMENTS

2011/0134968 A1\* 6/2011 Han ...................... H04L 5/0023
                                                              375/146
2015/0067435 A1\* 3/2015 Yerramalli ............ H04L 1/0034
                                                              714/748

(Continued)

FOREIGN PATENT DOCUMENTS

WO    2015031743 A1    3/2015
WO    2019053631 A1    3/2019

OTHER PUBLICATIONS

International Search Report and Written Opinion—PCT/US2020/020329—ISA/EPO—dated Jun. 16, 2020.

(Continued)

*Primary Examiner* — Michael Thier
*Assistant Examiner* — Nevena Zecevic Sandhu
(74) *Attorney, Agent, or Firm* — Patterson & Sheridan, LLP

(57) ABSTRACT

Certain aspects of the present disclosure provide a method for wireless communications by a first wireless communication device. The method obtains a set of code blocks (CBs) of a transport block (TB) to be transmitted to a second wireless communication device. The method then transmits the CBs to the second wireless communication device in multiple transmissions, such that an order of the CBs for each transmission is determined by a permutation order for that transmission.

30 Claims, 9 Drawing Sheets

(56) References Cited

U.S. PATENT DOCUMENTS

| | | | |
|---|---|---|---|
| 2015/0358138 A1* | 12/2015 | Hwang | H04L 5/0055 |
| | | | 370/280 |
| 2017/0272211 A1* | 9/2017 | Chen | H04L 1/1819 |
| 2019/0261217 A1* | 8/2019 | Nammi | H04L 1/0072 |
| 2019/0261288 A1* | 8/2019 | Loehr | H04W 72/0446 |
| 2020/0092044 A1* | 3/2020 | Park | H04W 28/04 |

OTHER PUBLICATIONS

Samsung: "Code Block Reordering in HARQ Retransmissions", 3GPP TSG RAN WG1 Meeting #50, 3GPP Draft; R1-073579, 3rd Generation Partnership Project (3GPP), Mobile Competence Centre; 650, Route Des Lucioles; F-06921 Sophia-Antipolis Cedex; France, vol. RAN WG1, No. Athens, Greece; Aug. 20, 2020-Aug. 24, 2020, Aug. 15, 2007 (Aug. 15, 2007), pp. 1-4, XP050107182, [retrieved on Aug. 15, 2007].

* cited by examiner

METHODS FOR RETRANSMISSION FOR IMPROVED HANDLING OF VULNERABLE SYMBOLS

CROSS-REFERENCE TO RELATED APPLICATION(S)

This application claims benefit of and priority to U.S. Provisional Patent Application Ser. No. 62/822,665, filed on Mar. 22, 2019, herein incorporated by reference in its entirety as if fully set forth below and for all applicable purposes.

BACKGROUND

Field of the Disclosure

Aspects of the present disclosure relate generally to wireless communications systems, and more particularly, to increasing reliability of transmissions sent using repetition using codeblock permutation.

Description of Related Art

Wireless communication systems are widely deployed to provide various telecommunication services such as telephony, video, data, messaging, broadcasts, etc. These systems may employ multiple-access technologies capable of supporting communications with multiple users by sharing available system resources (e.g., bandwidth and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs) that each can simultaneously support communication for multiple communication devices, otherwise known as user equipment (UEs). In LTE or LTE-A network, a set of one or more gNBs may define an e NodeB (eNB). In other examples (e.g., in a next generation, new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a NR BS, a NR NB, a network node, a 5G NB, a next generation NB (gNB), etc.). A gNB or DU may communicate with a set of UEs on downlink channels (e.g., for transmissions from a base station or to a UE) and uplink channels (e.g., for transmissions from a UE to a gNB or DU).

These multiple access technologies have been adopted in various telecommunication standards to provide a common protocol that enables different wireless devices to communicate on a municipal, national, regional, and even global level. NR (e.g., 5G radio access) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

Such improvements may help enable "peer to peer" communication between a variety of devices, also referred to as device to device (D2D) communications. Examples of D2D communications include vehicle to everything (V2X) communications where a vehicle may communicate with another vehicle (V2V) or a different device, such as a base station, traffic control system, or the like (all of which may help enable autonomous driving).

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a first wireless communication device. The method generally includes obtaining a set of code blocks (CBs) of a transport block (TB) to be transmitted to a second wireless communication device and transmitting the CBs to the second wireless communication device in multiple transmissions, wherein an order of the CBs for each transmission is determined by a permutation order for that transmission.

Certain aspects of the present disclosure provide a first wireless communication device. The first wireless communication device includes a memory and a processor coupled to the memory. The processor is configured to obtain a set of CBs of a TB to be transmitted to a second wireless communication device, and transmit the CBs to the second wireless communication device in multiple transmissions, wherein an order of the CBs for each transmission is determined by a permutation order of that transmission.

Certain aspects of the present disclosure provide a first wireless communication device. The first wireless communication device includes means for obtaining a set of CBs of a TB to be transmitted to a second wireless communication device, and means for transmitting the CBs to the second wireless communication device in multiple transmissions, wherein an order of the CBs for each transmission is determined by a permutation order for that transmission.

Certain aspects of the present disclosure provide a non-transitory computer readable storage medium that stores instructions that when executed by a first wireless communication device cause the first wireless communication device to obtain a set of CBs of a TB to be transmitted to a second wireless communication device, and transmit the CBs to the second wireless communication device in multiple transmissions, wherein an order of the CBs for each transmission is determined by a permutation order of that transmission.

Certain aspects of the present disclosure provide a method for a first wireless communication device. The method generally includes receiving a set of CBs of a TB transmitted from a second wireless communication device via multiple transmissions, determining a permutation order used to transmit the CBs in the multiple transmissions, and processing the CBs according to the permutation order.

Certain aspects of the present disclosure provide a first wireless communication device. The first wireless communication device includes a memory and a processor coupled to the memory. The processor is configured to receive a set of CBs of a TB transmitted from a second wireless communication device via multiple transmissions, determine a permutation order used to transmit the CBs in the multiple transmissions, and process the CBs according to the permutation order.

Certain aspects of the present disclosure provide a first wireless communication device. The first wireless communication device includes means for receiving a set of CBs of a TB transmitted from a second wireless communication device via multiple transmissions, means for determining a permutation order used to transmit the CBs in the multiple transmissions, and means for processing the CBs according to the permutation order.

Certain aspects provide a non-transitory computer readable storage medium that stores instructions that when executed by a first wireless communication device cause the first wireless communication device to receive a set of CBs of a TB transmitted from a second wireless communication device via multiple transmissions, determine a permutation order used to transmit the CBs in the multiple transmissions, and process the CBs according to the permutation order.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
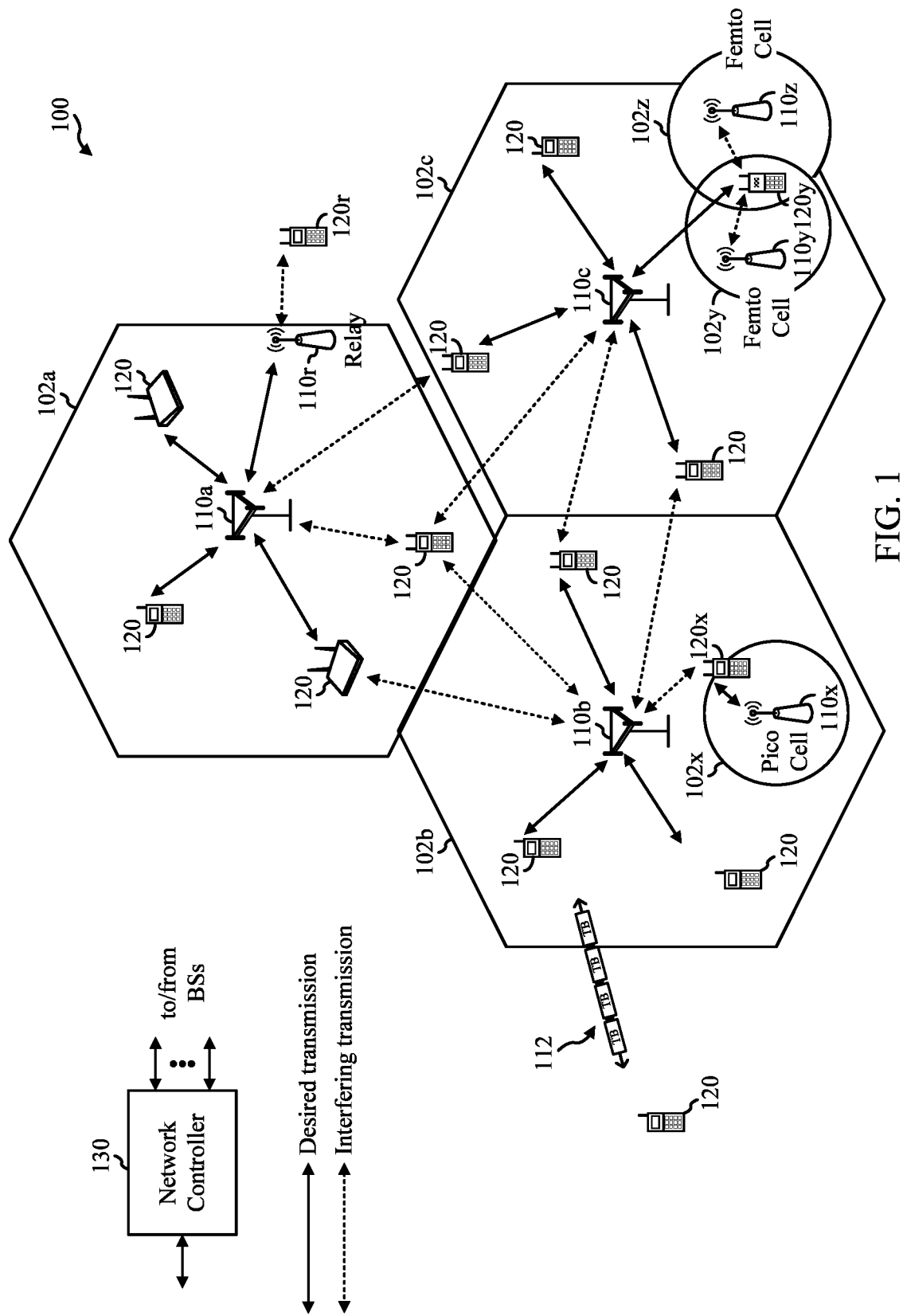
FIG. 1 is a block diagram conceptually illustrating an example telecommunications system, in accordance with certain aspects of the present disclosure.

As noted above, examples of D2D communications include vehicle to everything (V2X) communications where a vehicle may communicate with another vehicle (V2V) or a different device, such as a base station, traffic control system, or the like. One challenge presented in such scenarios is that certain portions of a transmission may not be received at a receiver device due to various factors. For example, first and/or last symbols of a transmission time interval (TTI), referred to herein as "vulnerable symbols," may be potentially lost at the receiver due to automatic gain control (AGC) re-training, radio frequency (RF) retuning (as a device switches from transmission to reception), and half duplex (HD) communication restraints (e.g., as a receiver UE needing to transmit an ACK/NACK on a symbol).

Aspects of the present disclosure, however, propose a low-complexity retransmission scheme for improved handling of vulnerable symbols to provide robustness to potential symbol puncturing at the receiver. As will be described in greater detail below, by using different permutations of code blocks (CBs) across retransmissions of the same transport block (TB) some aspects may provide improved handling of the vulnerable symbols.

The techniques presented herein may be applied in various scenarios, such as NR (new radio access technology or 5G technology). NR may support various wireless communication services, such as enhanced mobile broadband (eMBB) targeting wide bandwidth (e.g. 80 MHz beyond), millimeter wave (mmW) targeting high carrier frequency (e.g. 27 GHz or beyond), massive machine type communications (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In certain systems, (e.g., 3GPP Release-13 long term evolution (LTE) networks), enhanced machine type communications (eMTC) are supported, targeting low cost devices, often at the cost of lower throughput. eMTC may involve half-duplex (HD) operation in which uplink transmissions and downlink transmissions can both be performed—but not simultaneously. Some eMTC devices (e.g., eMTC UEs) may look at (e.g., be configured with or monitor) no more than around 1 MHz or six resource blocks (RBs) of bandwidth at any given time. eMTC UEs may be configured to receive no more than around 1000 bits per subframe. For example, these eMTC UEs may support a max throughput of around 300 Kbits per second. This throughput may be sufficient for certain eMTC use cases, such as certain activity tracking, smart meter tracking, and/or updates, etc., which may consist of infrequent transmissions of small amounts of data; however, greater throughput for eMTC devices may be desirable for other cases, such as certain Internet-of-Things (IoT) use cases, wearables such as smart watches, etc.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, techniques presented herein may help improve the reliability of V2V communications between two UEs 120 by permuting the order of CBs for the same TB sent over multiple transmissions/retransmissions 112.

The wireless network 100 may be, for example, a new radio (NR) or 5G network. A UE 120 may be configured for enhanced machine type communications (eMTC). The UE 120 may be considered a low cost device, low cost UE, eMTC device, and/or eMTC UE. The UE 120 can be configured to support higher bandwidth and/or data rates (e.g., higher than 1 MHz). The UE 120 may be configured with a plurality of narrowband regions (e.g., 24 resource blocks (RBs) or 96 RBs). The UE 120 may receive a resource allocation, from a gNB 110, allocating frequency hopped resources within a system bandwidth for the UE 120 to monitor and/or transmit on. The resource allocation can indicate non-contiguous narrowband frequency resources for uplink transmission in at least one subframe. The resource allocation may indicate frequency resources are not contained within a bandwidth capability of the UE to monitor for downlink transmission. The UE 120 may determine, based on the resource allocation, different narrowband than the resources indicated in the resource allocation from the gNB 110 for uplink transmission or for monitoring. The resource allocation indication (e.g., such as that included in the downlink control information (DCI)) may include a set of allocated subframes, frequency hopping related parameters, and an explicit resource allocation on the first subframe of the allocated subframes. The frequency hopped resource allocation on subsequent subframes are obtained by applying the frequency hopping procedure based on the frequency hopping related parameters (which may also be partly included in the DCI and configured partly through radio resource control (RRC) signaling) starting from the resources allocated on the first subframe of the allocated subframes.

As illustrated in FIG. 1, the wireless network 100 may include a number of gNBs 110 and other network entities. A gNB may be a station that communicates with UEs. Each gNB 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and NB, next generation NB (gNB), 5G NB, access point (AP), BS, NR BS, or transmission reception point (TRP) may be interchangeable. In some examples, a cell may not necessarily be stationary, and the geographic area of the cell may move according to the location of a mobile gNB. In some examples, the gNBs may be interconnected to one another and/or to one or more other gNBs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, a subcarrier, etc. Each frequency may support a single RAT in a given geographic area in order to avoid interference between wireless networks of different RATs. In some cases, NR or 5G RAT networks may be deployed.

A gNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A gNB for a macro cell may be referred to as a macro gNB. A gNB for a pico cell may be referred to as a pico gNB. A gNB for a femto cell may be referred to as a femto gNB or a home gNB. In the example shown in FIG. 1, the gNBs 110*a*, 110*b* and 110*c* may be macro gNBs for the macro cells 102*a*, 102*b* and 102*c*, respectively. The gNB 110*x* may be a pico gNB for a pico cell 102*x*. The gNBs 110*y* and 110*z* may be femto gNB for the femto cells 102*y* and 102*z*, respectively. A gNB may support one or multiple (e.g., three) cells.

The wireless network 100 may also include relay stations. A relay station is a station that receives a transmission of data and/or other information from an upstream station (e.g., a gNB or a UE) and sends a transmission of the data and/or other information to a downstream station (e.g., a UE or a gNB). A relay station may also be a UE that relays transmissions for other UEs. In the example shown in FIG. 1, a relay station 110*r* may communicate with the gNB 110*a* and a UE 120*r* in order to facilitate communication between the gNB 110*a* and the UE 120*r*. A relay station may also be referred to as a relay gNB, a relay, etc.

The wireless network 100 may be a heterogeneous network that includes gNBs of different types, e.g., macro gNB, pico gNB, femto gNB, relays, etc. These different types of gNBs may have different transmit power levels, different coverage areas, and different impact on interference in the wireless network 100. For example, a macro gNB may have a high transmit power level (e.g., 20 Watts) whereas pico gNB, femto gNB, and relays may have a lower transmit power level (e.g., 1 Watt).

The wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. The techniques described herein may be used for both synchronous and asynchronous operation.

A network controller 130 may couple to a set of gNBs and provide coordination and control for these gNBs. The network controller 130 may communicate with the gNBs 110 via a backhaul. The gNBs 110 may also communicate with one another, for example, directly or indirectly via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a gNB, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving gNB, which is a gNB designated to serve the UE on the downlink and/or uplink. A finely dashed line with double arrows indicates interfering transmissions between a UE and a gNB.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (e.g., an RB) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100

MHz may be supported. NR resource blocks may span 12 sub-carriers with a sub-carrier bandwidth of 75 kHz over a 0.1 ms duration. Each radio frame may consist of two half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16, . . . slots) depending on the tone-spacing (e.g., 15, 30, 60, 120, 240 . . . kHz).

In some examples, access to the air interface may be scheduled, wherein a scheduling entity (e.g., a gNB) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. gNBs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
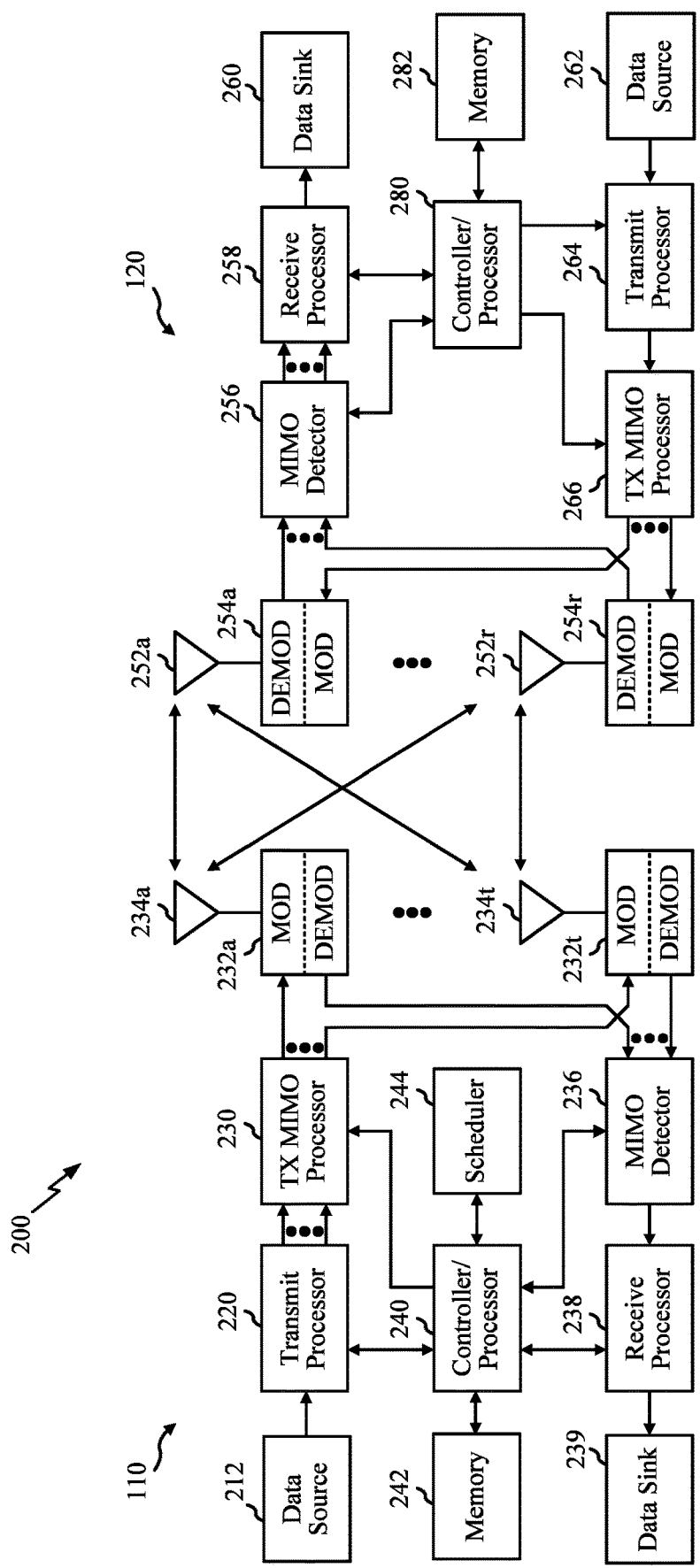
FIG. 2 is a block diagram conceptually illustrating a design of an example base station (BS) and user equipment (UE), in accordance with certain aspects of the present disclosure.

FIG. 2 illustrates example components of the gNB 110 and UE 120 illustrated in FIG. 1, which may be used to implement aspects of the present disclosure for frequency hopping for large bandwidth allocations. For example, antennas 252, Tx/Rx 222, processors 266, 258, 264, and/or controller/processor 280 of the UE 120 and/or antennas 234, processors 260, 220, 238, and/or controller/processor 240 of the gNB 110 may be used to perform the operations described herein and illustrated with reference to FIGS. 8 and 9.

FIG. 2 shows a block diagram of a design of a gNB 110 and a UE 120, which may be one of the gNBs and one of the UEs in FIG. 1. For a restricted association scenario, the gNB 110 may be the macro gNB 110c in FIG. 1, and the UE 120 may be the UE 120y. The gNB 110 may also be gNB of some other type. The gNB 110 may be equipped with antennas 234a through 234t, and the UE 120 may be equipped with antennas 252a through 252r.

At the gNB 110, a transmit processor 220 may receive data from a data source 212 and control information from a controller/processor 240. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 220 may process (e.g., encode and symbol map) the data and control information to obtain data symbols and control symbols, respectively. The processor 220 may also generate reference symbols, e.g., for the PSS, SSS, and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the gNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the Physical Uplink Shared Channel (PUSCH)) from a data source 262 and control information (e.g., for the Physical Uplink Control Channel (PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the gNB 110. At the gNB 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the gNB 110 and the UE 120, respectively. The processor 240 and/or other processors and modules at the gNB 110 may perform or direct, e.g., the execution of various processes for the techniques described herein. The processor 280 and/or other processors and modules at the UE 120 may also perform or direct, e.g., the execution of the functional blocks illustrated in FIGS. 8 and 9, and/or other processes for the techniques described herein.

Figure 3:
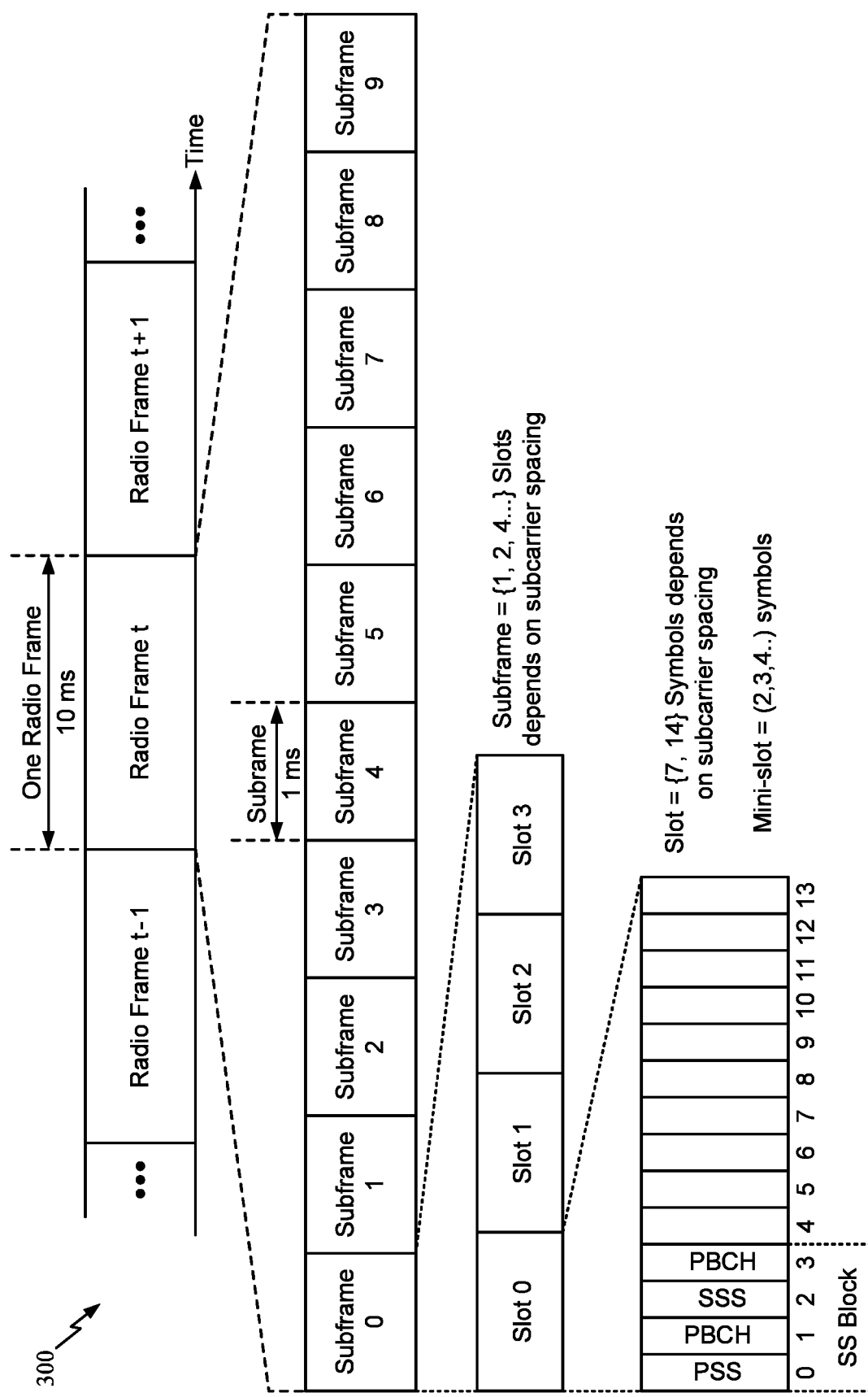
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or gNB), even though the scheduling entity may be utilized for scheduling and/or control purposes. In some examples, the sidelink signals may be communicated using a licensed spectrum (unlike wireless local area networks, which typically use an unlicensed spectrum).

Example Techniques for Retransmission for Improved Handling of Vulnerable Symbols Certain aspects of the present disclosure provide apparatus and techniques for improving the handling of vulnerable symbols to improve the reliability of transport blocks (TBs) sent using retransmissions. The techniques may help provide robustness to potential symbol puncturing at the receiver, by spreading the impact of vulnerable symbols across the different code blocks by permuting across retransmissions.

As described above, certain symbols of a transmission may be vulnerable to potential loss at a receiver due to factors such as automatic gain control (AGC) re-training, RF retuning, and half duplex (HD) communication restraints. At the receiver, any vulnerable symbol that is punctured (meaning certain bits are removed) is handled by setting the log likelihood ratios (LLRs) corresponding to that symbol equal to zero.

Puncturing symbols at the receiver in this manner may lead to catastrophic error (BLER=1 at all SNRs) or significant performance degradation, depending on transmission factors such as coding, resource element (RE) mapping, and the like. For example, it has been observed that certain transport block size (TBS) and modulation and coding scheme (MCS) combinations tend to lead to catastrophic block error rates (BLER), possibly due to the vulnerable symbols impacting the same code blocks. Some improvements may be seen if rate-matching is performed for the last symbol instead of puncturing, but the first symbol can still be lost due to Rx side puncturing (e.g., due to AGC).

Figure 4:
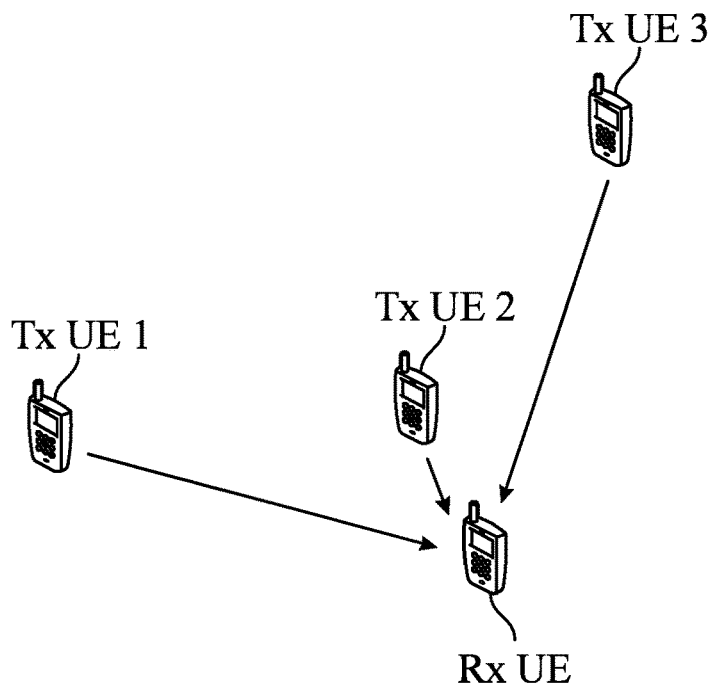
FIG. 4 illustrates an example V2V deployment, in which aspects of the present disclosure may be practiced.
Figure 5:
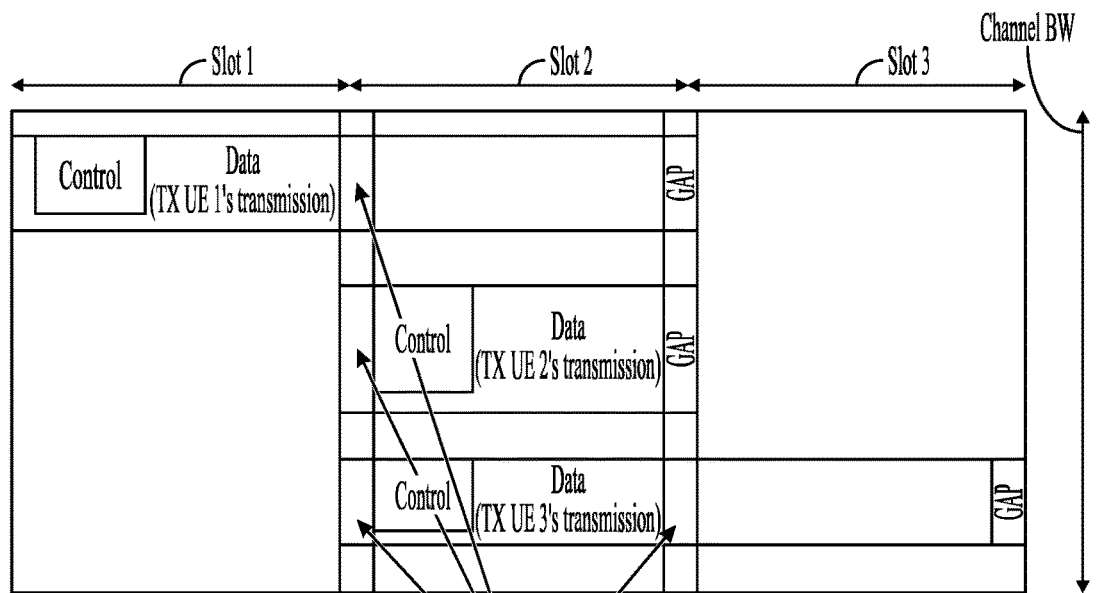
FIG. 5 illustrates an example depiction of vulnerable symbols for the V2V deployment of FIG. 4, in accordance with certain aspects of the present disclosure.

AGC retraining may be particularly problematic in V2V/V2X scenarios, such as the V2V scenario shown in FIG. 4, due to the possibility of multiple UEs, that are at different distances from a receiver UE, transmitting at the same time. FIG. 5 illustrates an example depiction of vulnerable symbols for the example V2V deployment of FIG. 4.

In the scenario depicted in FIG. 4, three UEs (UE 1, UE 2, and UE 3) are transmitting (Tx UEs), while one UE is receiving (Rx UE). In the illustrated example, Tx UE 2 is relatively close to Rx UE, while Tx UE 1 and Tx UE 2 are further away.

As a result, as shown in FIG. 5, when Tx UE 2 starts its transmission in Slot 2, Rx UE may experience low noise amplifier (LNA). As a result, Rx UE may lose the first symbol of the slot 2 transmission (from each Tx UE) due to automatic gain control (AGC) retraining (and/or LNA gain setting), based on the new received power level in this slot. This may be particularly problematic for slot 2 transmissions from Tx UE 2 and Tx UE 3 that include control information.

As illustrated, Tx UE 2 stops its transmission at the end of slot 2, which leads to much lower received power in slot 3 (and in last symbol of slot 2). This leads to another round of AGC retraining to reduce quantization noise when receiving the remainder of the Tx UE 2 transmission (and the Tx UE 3 transmission in Slot 3).

There are various solutions that may help address the impact of vulnerable symbols. One option is to avoid mapping coded bits with higher importance (systematic bits) to resource elements (REs) that are vulnerable to Rx puncturing. Unfortunately, while this solution may yield performance gains by protecting CBs equally, this solution is relatively complex, requiring changes to (a) bit interleaver, (b) VRB mapping, and (c) codeblock concatenation.

A second option is to avoid using the vulnerable symbols. In other words, a UE may decide not attempt to opportunistically use the vulnerable symbols in the first place. In such cases, vulnerable symbols may be rate matched at the Tx itself (and not used to transmit information bits). This option obviously results in a loss with respect to spectral efficiency, throughput, and range. The amount of loss may depend on the subcarrier spacing (SCS) and other transmit parameters (such as the total number of REs available for data bits). In some cases, where the vulnerable symbol is due to AGC, the AGC symbol can then be special sequence, with the special sequence designed to be used for AGC purpose only.

A third option is to attempt to reduce the impact caused by vulnerable symbols by modifying CB concatenation procedures when TBs are sent using retransmission to increase reliability. In some cases, the TBs may be retransmitted "blindly" meaning without regard to or knowledge of whether the initial transmission was successfully decoded or not. Such blind retransmissions may be used in various scenarios, such as for sidelink communications between devices, for half-duplex communications, and to increase reliability in scenarios that have limited or no feedback (e.g. broadcast scenarios).

Aspects of the present disclosure provide techniques to improve performance of TBs sent with retransmissions (blind or feedback based), by permuting the order of CBs when vulnerable symbols may be punctured at Rx.

Figure 6:
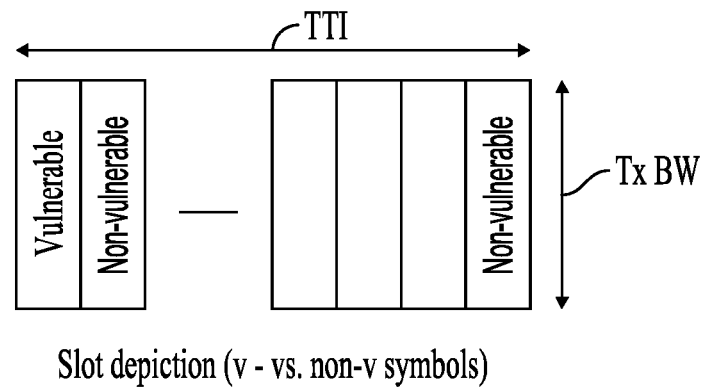
FIGS. 6 and 7 illustrate examples of the impact of vulnerable symbols on certain code blocks (CBs) based on concatenation, in accordance with certain aspects of the present disclosure.
Figure 6:
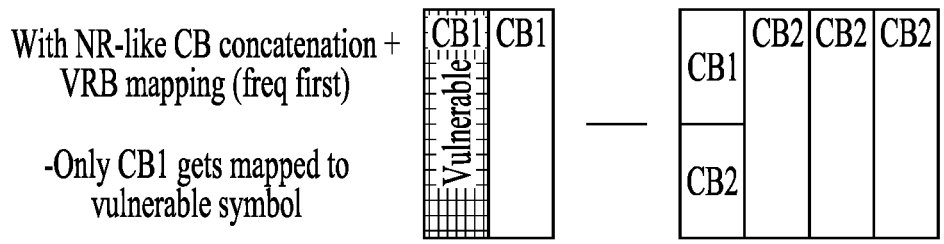
Figure 7:
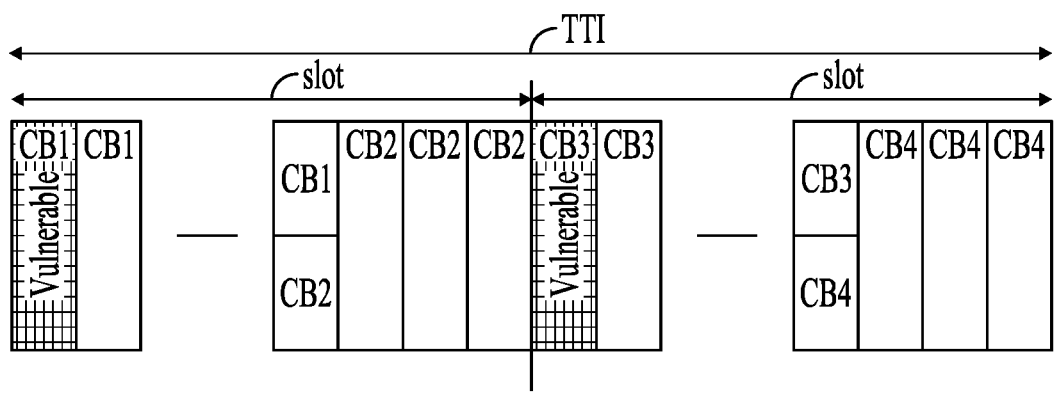

FIGS. 6 and 7 illustrate examples of the impact of vulnerable symbols on certain code blocks (CBs), based on the order in which they are concatenated.

FIG. 6 illustrates an example with two code blocks (CB1 and CB2) transmitted in a single slot with the first symbol being a vulnerable symbol. As illustrated, with conventional CB concatenation and virtual resource block (VRB) mapping, CBs are mapped frequency first starting with the first symbol, beginning with the first CB to the last. This leads to unequal CB protection from the vulnerable symbol(s). In other words, in this example, only CB1 is mapped to a vulnerable symbol, so all the puncturing is in CB1, while CB2 is not punctured. Thus, CB1 will have degraded performance compared to CB2.

FIG. 7 illustrates an example with four code blocks (CB1-CB4) transmitted over two slots, with the first symbol in each slot being a vulnerable symbol. In this case, with conventional CB concatenation and VRB mapping, only CB1 is mapped to a vulnerable symbol in the first slot, while only CB3 is mapped to a vulnerable symbol in the second slot. So, in this example, all the puncturing is in CB1 and CB3, while CB2 and CB4 are not punctured. Thus, CB1 and CB3 will have degraded performance compared to CB2 and CB4.

In current systems, for all retransmissions, the CBs are concatenated in the same order. Thus, for the examples shown in FIGS. 6 and 7, even in the retransmissions, the same CBs will be unprotected from vulnerable symbols and will have degraded performance.

Ensuring equal protection and performance of all CBs is particularly important when TB-level ACK/NACK feedback is employed, as all CBs are subject to retransmission. The problem is that with vulnerable symbols, conventional CB concatenation means that the same CB is always punctured in each retransmission.

Aspects of the present disclosure, however, provide a relatively low-complexity retransmission scheme for improved handling of vulnerable symbols to provide robustness to potential symbol puncturing at the receiver by permuting CB order across retransmission(s).

As used herein, the term permutation refers to a set of CBs in a particular order, such that each set of n CBs would have n! possible permutations. In other words, 3 CBs (CB1-CB3) would have six total permutations (CB1-CB2-CB3, CB1-CB3-CB2, CB2-CB1-CB3, CB2-CB3-CB1, CB3-CB1-CB2, and CB3-CB1-CB2). As used herein, the term permutation order refers to the order in which different permutations occur across different transmissions. For example, for a two CB set, a permutation order may indicate CBs are transmitted as (CB1-CB2) for one transmission and (CB2-CB1) for the next transmission, and this order may be repeated every two transmissions.

Figure 8:
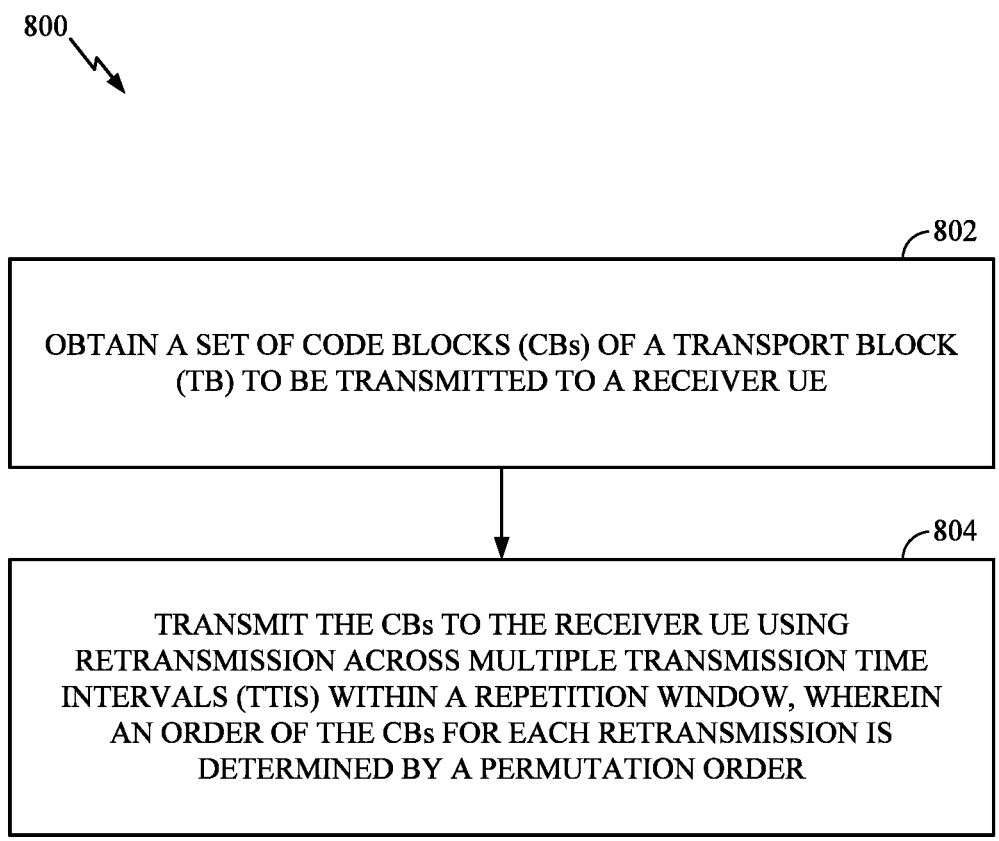
FIG. 8 illustrates example operations for wireless communication by a transmitter user equipment (UE), in accordance with certain aspects of the present disclosure.

FIG. 8 illustrates example operations 800 for wireless communication by a (transmitter) UE that may help improve reliability of transmissions subject to vulnerable symbols by permuting the order of CBs over retransmissions, in accordance with certain aspects of the present disclosure. The operations 800 may be performed, for example, by a UE 120 shown in FIG. 1 (to send V2V communications to another UE 120).

Operations 800 begin, at block 802, by obtaining a set of code blocks (CBs) of a transport block (TB) to be transmitted to another UE. Depending on the size of the TB, the CBs may be transmitted over a single slot or multiple slots.

At 804, the transmitter UE transmits the CBs to the other UE using retransmission across multiple transmission time intervals (TTIs) within a repetition window, wherein an order of the CBs for each retransmission is determined by a permutation order. As will be described in greater detail below, the permutation order may be designed to ensure the impact of vulnerable symbols is spread across multiple CBs (so the same CBs are not impacted in each transmission/retransmission).

Figure 9:
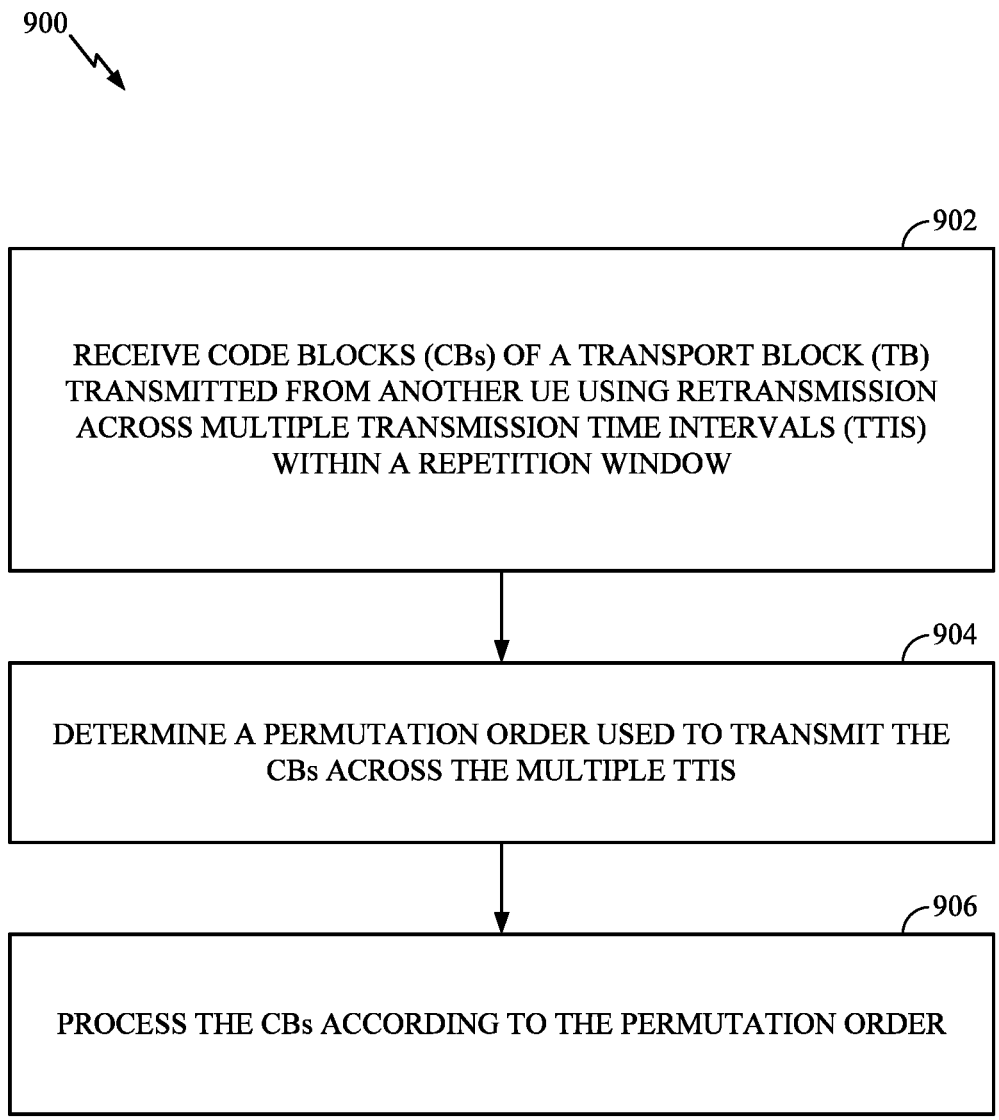
FIG. 9 illustrates example operations for wireless communication by a receiver UE, in accordance with certain aspects of the present disclosure.

FIG. 9 illustrates example operations 900 for wireless communication by a (receiver) UE, in accordance with certain aspects of the present disclosure. The operations 900 may be performed, for example, by a UE to process V2V transmissions received from another UE performing operations 800.

The operations 900 begin, at block 902, by receiving code blocks (CBs) of a transport block (TB) transmitted from another UE using retransmission across multiple transmission time intervals (TTIs) within a repetition window. At 904, the UE, determines a permutation order used to transmit the CBs across the multiple TTIs. At 906, the UE processes the CBs according to the permutation order.

In other words, with knowledge of the order in which the CBs are concatenated in each transmission, the UE may be able to assemble the complete TB (e.g., using soft combining of LLRs when possible). In some cases, even if all CBs are not successfully received in any single transmission, permuting the order in retransmissions may allow the CBs to be successfully received across multiple transmissions which may be sufficient (and the receiving UE may provide a positive ACK in such cases).

Figure 10:
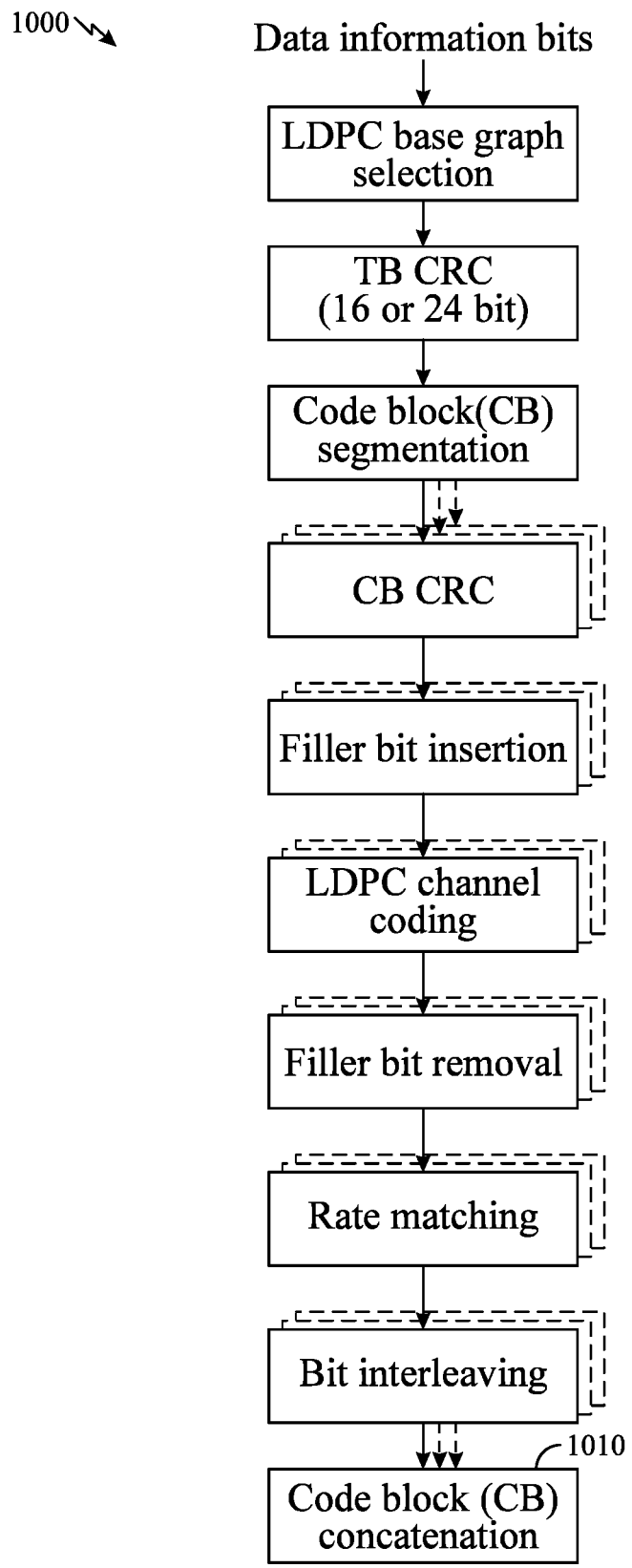
FIG. 10 illustrates an example of a code block (CB) concatenation block that may permute code blocks across retransmissions, in accordance with certain aspects of the present disclosure.

The logic for permuting the CB order across retransmissions (e.g., according to operations 800) may be implemented in the transmit chain. For example, as illustrated in FIG. 10, the logic may be implemented in a CB concatenation logic block 1010 of a Tx chain 1000.

Figure 11:
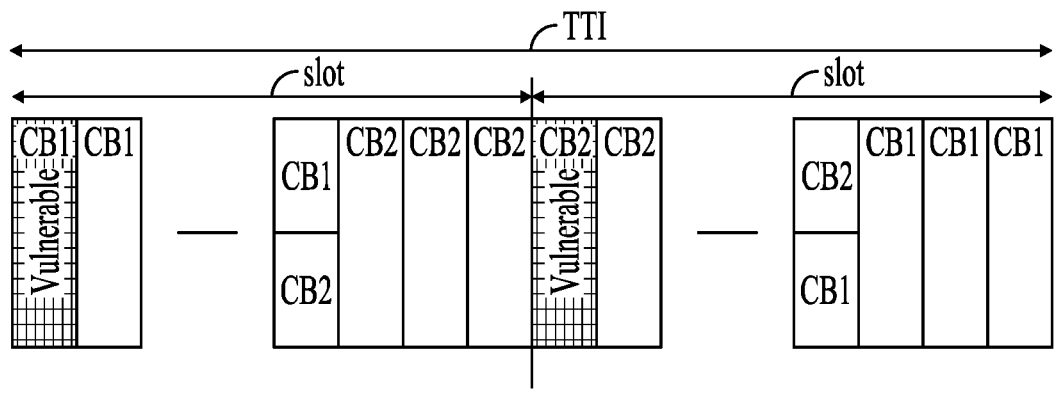
FIGS. 11 and 12 illustrate examples of CB permutation across retransmissions, in accordance with certain aspects of the present disclosure.
Figure 12:
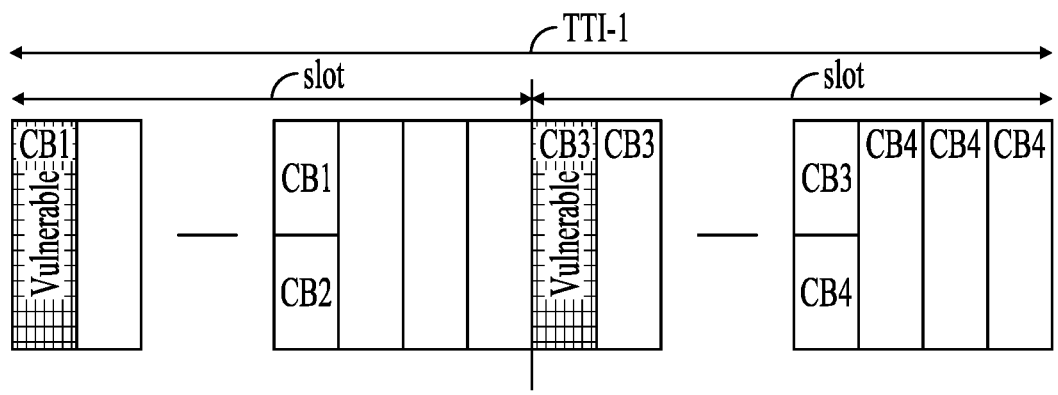
Figure 12:
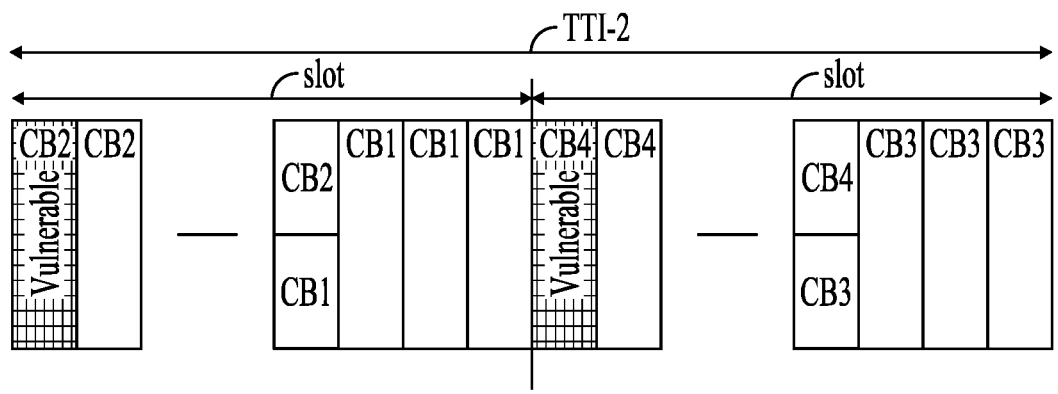

FIGS. 11 and 12 illustrate examples of CB permutation across retransmissions, in accordance with certain aspects of the present disclosure.

FIG. 11 illustrates how CB order can be permuted across retransmissions for an example of two CBs transmitted in a single slot. As illustrated, for a first transmission, the CBs may be mapped as shown in FIG. 6 (CB1-CB2), where only CB1 is mapped to the vulnerable symbol and subject to puncturing. In a retransmission, however, in a subsequent slot, the order is reversed (CB2-CB1), such that CB2 is mapped first. As a result, in the second slot, CB1 is protected. As a result, after the two transmissions, both CB1 and CB2 have been protected which may greatly increase the chance of successful reception of both CBs.

FIG. 12 illustrates how CB order can be permuted across retransmissions for an example of four CBs transmitted in two slots. As illustrated, for a first transmission, the CBs may be mapped as shown in FIG. 7 (CB1-CB2-CB3-CB4), where only CB1 is mapped to the vulnerable symbol in the first slot, while CB3 is mapped to the vulnerable symbol in the second slot. In a retransmission, however, in a subsequent TTI, the order is changed (to CB2-CB1-CB4-CB3), such that CB2 is mapped first in the first slot while CB4 is mapped first in the second slot. As a result, in the second TTI, CB1 and CB3 are protected. As a result, after the two TTIs, all four CBs have been protected which may greatly increase the chance of successful reception of both CBs.

In some cases, the permutation order (that defines which permutation of CBs is used each transmission/retransmission) may be based on (specified in) a wireless standard specification. In some cases, the permutation order may be (pre)configured for a UE using, for example, RRC (pre) configuration.

In some cases, the permutation order may additionally depend on the number of code blocks being transmitted.

For example, as illustrated in FIG. 12, for four code blocks, a first transmission, with a first redundancy version RV (0), the CB order may be [CB1-CB2-CB3-CB4], while for a retransmission (with RV1), the CB order may be [CB2-CB1-CB4-CB3], with the italicized CBs subject to puncturing. This permutation order may be repeated for each retransmission. For the two slot case with the first symbol vulnerable in each slot, this permutation order will make sure almost equal protection on all CBs, assuming 1 symbol in each slot in punctured at the Rx UE (e.g., for AGC).

As another example, for six CBs transmitted over 2 slots, a first transmission may be sent (with RV0) with a CB order [CB1-CB2-CB3-CB4-CB5-CB6], a first retransmission may be sent (with RV2) with a CB order [CB2-CB3-CB1-CB5-CB6-CB4], while a second retransmission may be sent (with RV3) with a CB order [CB3-CB1-CB2-CB6-CB4-CB5], with the italicized CBs subject to puncturing. For the two-slot case with the first symbol vulnerable in each slot, all the CBs are equally punctured over the three (re)transmissions.

In some cases, the permutation order may (additionally) depend on the number of slots being used for each transmission. For example, for four CBs and two slots, a first transmission (with RV0) may have the CB order [CB1-CB2-CB3-CB4], while a retransmission (with RV1) may have the CB order [CB2-CB1-CB4-CB3], and this permutation order may repeat every two transmissions. For four CBs and only one slot, a first transmission (with RV0) may have the CB order [CB1-CB2-CB3-CB4], while a first retransmission (with RV1) may have the CB order [CB2-CB3-CB4-CB1], a second retransmission (with RV2) may have the CB order [CB3-CB4-CB1-CB2], while a third retransmission (with RV3) may have the CB order [CB4-CB1-CB2-CB3], and this permutation order may repeat every four transmissions. Making the permutation order depend on the number of slots may help prevent one CB from suffering more than others because of the number of slots being transmitted.

In some cases, the transmitter may indicate the RV index and the corresponding CB permutation order as a part of a control transmission. In some cases, the CB permutation order may be indicated as an index into a table of allowed CB permutation orders. While this may increase the control payload, it may have an advantage in flexibility over having a single permutation order fixed in a standard specification. It should be noted that in the aspects described above and below, the order of RVs (e.g., RV0/1/2/3) may simply indicate a first, second, third, etc., redundancy version, and may not suggest any particular ordering of the versions. For example, a typical ordering of the RVs may be RV0, RV2, RV3, and RV1 in some aspects of the present disclosure.

As illustrated by the examples described above, in some cases, retransmissions may have different redundancy versions with CB order permutation. For example, this may be the case for hybrid automatic repeat request (HARQ) with incremental redundancy (IR) transmissions.

For other cases, retransmissions may be sent with the same redundancy version with CB order permutation. For example, this may be the case for HARQ with chase combining (CC) transmissions. An example of this approach with four CBs sent across two slots with a single vulnerable symbol may be to use RV0 and CB order [CB1-CB2-CB3-CB4] for a first transmission and RV0 and CB order [CB2-CB1-CB4-CB3], for a retransmission.

As noted above, ensuring equal protection and decoding performance of all CBs may be particularly important for TB-level ACK/NACK (where single CBs are not acknowledged separately). However, the approach may still be used in case of CB level ACK/NACK, but at the cost of the additional feedback overhead. Equal (or relatively equal) CB protection may still be important for CBG level ACK/NACK, depending on #CBs in CBG.

The following 2-CB example may demonstrate how the techniques presented herein may help in systems with TB-level ACK/NACK. In a first transmission, CB1 may be partially punctured, but CB2 is not punctured. In this first transmission, CB1 will fail decoding, while CB2 will pass. After this first transmission, the Rx UE may feedback a NACK. For a retransmission, the order of CB1 and CB2 may be reversed, such that CB2 is partially punctured, but CB1 is not punctured. In this case, even though CB2 decoding failed, since CB1 passes, the Rx UE may feedback an ACK since CB2 was previously decoded successfully.

As noted above, blind HARQ retransmissions may be used for sidelink V2X communication. Thus, the CB permutation across retransmissions may help improve performance when Rx side puncturing of vulnerable symbols occurs. In some cases, each transmission itself may or may not be self-decodable. Hence, code rate gains by itself may not be sufficient to alleviate the problem, and CB permutation as described herein may help provide non-trivial gains in reliability.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

EXAMPLE EMBODIMENTS

Embodiment 1

A method for wireless communications by a first wireless communication device, comprising: obtaining a set of code blocks (CBs) of a transport block (TB) to be transmitted to a second wireless communication device; and transmitting the CBs to the second wireless communication device in multiple transmissions, wherein an order of the CBs for each transmission is determined by a permutation order for that transmission.

Embodiment 2

The method of embodiment 1, wherein the permutation order is designed to ensure different CBs are subject to different amounts of puncturing in different transmissions.

Embodiment 3

The method of any of embodiments 1-2, wherein the permutation order is one of: configured at the first wireless device, preconfigured at the first wireless device, or configured at the first wireless device via radio resource control (RRC) signaling.

Embodiment 4

The method of any of embodiments 1-3, wherein the permutation order depends, at least in part, on a number of code blocks in the set, and a position of vulnerable resources among resources used for the transmissions.

Embodiment 5

The method of any of embodiments 1-4, wherein: each transmission is across multiple transmission time intervals (TTIs); each TTI spans at least two time slots; and the permutation order depends, at least in part, on a number of time slots in the multiple TTIs.

Embodiment 6

The method of any of embodiments 1-5, further comprising indicating a redundancy version (RV) index and a corresponding permutation order as part of a control transmission.

Embodiment 7

The method of any of embodiments 1-6, wherein the permutation order for each transmission is indicated as an index into a table of allowed permutation orders.

Embodiment 8

The method of any of embodiments 1-7, wherein: the CBs are sent via Hybrid automatic repeat request (HARQ) incremental redundancy (IR); and the transmissions are sent with different redundancy versions (RVs).

Embodiment 9

The method of any of embodiments 1-8, wherein: the CBs are sent via Hybrid automatic repeat request (HARQ) Chase combining (CC); and the transmissions are sent with a same redundancy version (RV).

Embodiment 10

A method for wireless communications by a first wireless communication device, comprising: receiving a set of code blocks (CBs) of a transport block (TB) transmitted from a second wireless communication device via multiple transmissions; determining a permutation order used to transmit the CBs in the multiple transmissions; and processing the CBs according to the permutation order.

Embodiment 11

The method of embodiment 10, wherein the permutation order is designed to ensure different CBs are subject to different amounts of puncturing in different transmissions.

Embodiment 12

The method of any of embodiments 10-11, wherein the permutation order is one of: configured at the first wireless communication device, preconfigured at the first wireless communication device, or configured at the first wireless communication device via radio resource control (RRC) signaling.

Embodiment 13

The method of any of embodiments 10-12, wherein the permutation order depends, at least in part, on a number of code blocks in the set, and a position of vulnerable resources among resources used for the transmissions.

Embodiment 14

The method of any of embodiments 10-13, wherein: each transmission is across multiple transmission time intervals (TTIs); each TTI spans at least two time slots; and the permutation order depends, at least in part, on a number of time slots in the multiple TTIs.

Embodiment 15

The method of any of embodiments 10-14, further comprising determining a redundancy version (RV) index and a corresponding permutation order based on a decoded control transmission.

Embodiment 16

The method of any of embodiments 10-15, wherein the permutation order for each transmission is indicated as an index into a table of allowed permutation orders.

Embodiment 17

The method of any of embodiments 10-16, wherein: the CBs are processed via Hybrid automatic repeat request (HARQ) incremental redundancy (IR); and the transmissions are sent with different redundancy versions (RVs).

Embodiment 18

The method of any of embodiments 10-17, wherein: the CBs are processed via Hybrid automatic repeat request (HARQ) Chase combining (CC); and the transmissions are sent with a same redundancy version (RV).

Embodiment 19

A first wireless communication device, comprising: a memory; and a processor coupled to the memory, the processor being configured to: obtain a set of code blocks (CBs) of a transport block (TB) to be transmitted to a second wireless communication device; and transmit the CBs to the second wireless communication device in multiple transmissions, wherein an order of the CBs for each transmission is determined by a permutation order of that transmission.

Embodiment 20

The first wireless communication device of embodiment 19, wherein the permutation order is designed to ensure different CBs are subject to different amounts of puncturing in different transmissions.

Embodiment 21

The first wireless communication device of any of embodiments 19-20, wherein the permutation order is one of: configured at the first wireless device, preconfigured at the first wireless device, or configured at the first wireless device via radio resource control (RRC) signaling.

Embodiment 22

The first wireless communication device of any of embodiments 19-21, wherein: each transmission is across multiple transmission time intervals (TTIs); each TTI spans at least two time slots; and the permutation order depends, at least in part, on a number of time slots in the multiple TTIs.

Embodiment 23

The first wireless communication device of any of embodiments 19-22, wherein: the CBs are sent via Hybrid automatic repeat request (HARQ) incremental redundancy (IR); and the transmissions are sent with different redundancy versions (RVs).

Embodiment 24

The first wireless communication device of any of embodiments 19-23, wherein the permutation order depends, at least in part, on a number of code blocks in the set, and a position of vulnerable resources among resources used for the transmissions.

Embodiment 25

The first wireless communication device of any of embodiments 19-23, wherein the permutation order for each transmission is indicated as an index into a table of allowed permutation orders.

Embodiment 26

A first wireless communication device, comprising: a memory; and a processor coupled to the memory, the processor being configured to: receive a set of code blocks (CBs) of a transport block (TB) transmitted from a second wireless communication device via multiple transmissions; determine a permutation order used to transmit the CBs in the multiple transmissions; and process the CBs according to the permutation order.

Embodiment 27

The first wireless communication device of embodiment 26, wherein the permutation order is designed to ensure different CBs are subject to different amounts of puncturing in different transmissions.

Embodiment 28

The first wireless communication device of any of embodiments 26-27, wherein the permutation order is one of: configured at the first wireless communication device, preconfigured at the first wireless communication device, or configured at the first wireless communication device via radio resource control (RRC) signaling.

Embodiment 29

The first wireless communication device of any of embodiments 26-28, wherein the permutation order depends, at least in part, on a number of code blocks in the set, and a position of vulnerable resources among resources used for the transmissions.

Embodiment 30

The first wireless communication device of any of embodiments 26-29, wherein: the CBs are processed via Hybrid automatic repeat request (HARQ) Chase combining (CC); and the transmissions are sent with a same redundancy version (RV).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. For example, processors 266, 258, 264, and/or controller/processor 280 of the UE 120 shown in FIG. 2 may be configured to perform operations 800 of FIG. 8 (when acting as a Tx UE) and/or may be configured to perform operations 800 of FIG. 8 (when acting as a Tx UE).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

What is claimed is:

1. A method for wireless communications by a first wireless communication device, comprising:
obtaining a set of code blocks (CBs) of a transport block (TB) to be transmitted to a second wireless communication device; and
transmitting the set of CBs to the second wireless communication device blindly in multiple transmissions, such that the first wireless communication device does not require to receive a response from the second wireless communication device regarding status of decoding of a previous transmission before a next transmission of the CBs in the multiple transmissions, wherein an order of the CBs for each transmission is determined by a permutation order for that transmission, wherein the permutation order depends, at least in part, on a position of vulnerable resources among resources used for the transmissions, wherein the vulnerable resources comprise resources that are vulnerable to potential loss at the second wireless communication device, wherein the permutation order depends, at least in part, on a number of CBs in the set, wherein a number of possible permutations is a factorial of the number of the CBs.

2. The method of claim 1, wherein the permutation order is designed to ensure different CBs are subject to different amounts of puncturing in different transmissions.

3. The method of claim 1, wherein the permutation order is one of: configured at the first wireless communication device, preconfigured at the first wireless communication device, or configured at the first wireless communication device via radio resource control (RRC) signaling.

4. The method of claim 1, wherein the vulnerable resources comprise at least one of first or last symbol of a transmission time interval.

5. The method of claim 1, wherein:
each transmission is across multiple transmission time intervals (TTIs);
each TTI spans at least two time slots; and
the permutation order depends, at least in part, on a number of time slots in the multiple TTIs.

6. The method of claim 1, further comprising indicating a redundancy version (RV) index and a corresponding permutation order as part of a control transmission.

7. The method of claim 1, wherein the permutation order for each transmission is indicated as an index into a table of allowed permutation orders.

8. The method of claim 1, wherein:
the CBs are sent via Hybrid automatic repeat request (HARQ) incremental redundancy (IR); and
the transmissions are sent with different redundancy versions (RVs).

9. The method of claim 1, wherein:
the CBs are sent via Hybrid automatic repeat request (HARQ) Chase combining (CC); and
the transmissions are sent with a same redundancy version (RV).

10. A method for wireless communications by a first wireless communication device, comprising:
receiving a set of code blocks (CBs) of a transport block (TB) transmitted from a second wireless communication device blindly via multiple transmissions, such that the first wireless communication device does not require to transmit a response to the second wireless communication device regarding status of decoding of a previous transmission before a next transmission of the CBs in the multiple transmissions;
determining a permutation order used to transmit the set of CBs in the multiple transmissions; and
processing the set of CBs according to the permutation order, wherein the permutation order depends, at least in part, on a position of vulnerable resources among resources used for the transmissions, wherein the vulnerable resources comprise resources that are vulnerable to potential loss at the first wireless communication device, wherein the permutation order depends, at least in part, on a number of CBs in the set, wherein a number of possible permutations is a factorial of the number of the CBs.

11. The method of claim 10, wherein the permutation order is designed to ensure different CBs are subject to different amounts of puncturing in different transmissions.

12. The method of claim 10, wherein the permutation order is one of: configured at the first wireless communication device, preconfigured at the first wireless communication device, or configured at the first wireless communication device via radio resource control (RRC) signaling.

13. The method of claim 10, wherein the vulnerable resources comprise at least one of first or last symbol of a transmission time interval.

14. The method of claim 10, wherein:
each transmission is across multiple transmission time intervals (TTIs);
each TTI spans at least two time slots; and
the permutation order depends, at least in part, on a number of time slots in the multiple TTIs.

15. The method of claim 10, further comprising determining a redundancy version (RV) index and a corresponding permutation order based on a decoded control transmission.

16. The method of claim 10, wherein the permutation order for each transmission is indicated as an index into a table of allowed permutation orders.

17. The method of claim 10, wherein:
the CBs are processed via Hybrid automatic repeat request (HARQ) incremental redundancy (IR); and
the transmissions are sent with different redundancy versions (RVs).

18. The method of claim 10, wherein:
the CBs are processed via Hybrid automatic repeat request (HARQ) Chase combining (CC); and
the transmissions are sent with a same redundancy version (RV).

19. A first wireless communication device, comprising:
a memory; and
a processor coupled to the memory, the processor being configured to:
obtain a set of code blocks (CBs) of a transport block (TB) to be transmitted to a second wireless communication device; and
transmit the set of CBs to the second wireless communication device blindly in multiple transmissions, such that the first wireless communication device does not require to receive a response from the second wireless communication device regarding status of decoding of a previous transmission before a next transmission of the CBs in the multiple transmissions, wherein an order of the CBs for each transmission is determined by a permutation order of that transmission, wherein the permutation order depends, at least in part, on a position of vulnerable resources among resources used for the transmissions, wherein the vulnerable resources comprise resources that are vulnerable to potential loss at the second wireless communication device, wherein the permutation order depends, at least in part, on a number of CBs in the set, wherein a number of possible permutations is a factorial of the number of the CBs.

20. The first wireless communication device of claim 19, wherein the permutation order is designed to ensure different CBs are subject to different amounts of puncturing in different transmissions.

21. The first wireless communication device of claim 19, wherein the permutation order is one of: configured at the first wireless device, preconfigured at the first wireless device, or configured at the first wireless device via radio resource control (RRC) signaling.

22. The first wireless communication device of claim 19, wherein:
   each transmission is across multiple transmission time intervals (TTIs);
   each TTI spans at least two time slots; and
   the permutation order depends, at least in part, on a number of time slots in the multiple TTIs.

23. The first wireless communication device of claim 19, wherein:
   the CBs are sent via Hybrid automatic repeat request (HARQ) incremental redundancy (IR); and
   the transmissions are sent with different redundancy versions (RVs).

24. The first wireless communication device of claim 19, wherein the vulnerable resources comprise at least one of first or last symbol of a transmission time interval.

25. The first wireless communication device of claim 19, wherein the permutation order for each transmission is indicated as an index into a table of allowed permutation orders.

26. A first wireless communication device, comprising:
   a memory; and
   a processor coupled to the memory, the processor being configured to:
      receive a set of code blocks (CBs) of a transport block (TB) transmitted from a second wireless communication device blindly via multiple transmissions, such that the first wireless communication device does not require to transmit a response to the second wireless communication device regarding status of decoding of a previous transmission before a next transmission of the CBs in the multiple transmissions;
      determine a permutation order used to transmit the set of CBs in the multiple transmissions; and
      process the set of CBs according to the permutation order, wherein the permutation order depends, at least in part, on a position of vulnerable resources among resources used for the transmissions, wherein the vulnerable resources comprise resources that are vulnerable to potential loss at the first wireless communication device, wherein the permutation order depends, at least in part, on a number of CBs in the set, wherein a number of possible permutations is a factorial of the number of the CBs.

27. The first wireless communication device of claim 26, wherein the permutation order is designed to ensure different CBs are subject to different amounts of puncturing in different transmissions.

28. The first wireless communication device of claim 26, wherein the permutation order is one of: configured at the first wireless communication device, preconfigured at the first wireless communication device, or configured at the first wireless communication device via radio resource control (RRC) signaling.

29. The first wireless communication device of claim 26, wherein the vulnerable resources comprise at least one of first or last symbol of a transmission time interval.

30. The first wireless communication device of claim 26, wherein:
   the CBs are processed via Hybrid automatic repeat request (HARQ) Chase combining (CC); and
   the transmissions are sent with a same redundancy version (RV).

* * * * *